US006869674B2

(12) United States Patent
Finlayson et al.

(10) Patent No.: US 6,869,674 B2
(45) Date of Patent: Mar. 22, 2005

(54) BETASTRUCTURED MIXED ORGANIC AND INORGANIC CATION EXCHANGED LAYERED MATERIALS AND NANOCOMPOSITES

(75) Inventors: Malcolm F. Finlayson, Houston, TX (US); Chai-Jing Chou, Missouri City, TX (US); Michael S. Paquette, Midland, MI (US); Hoang T. Pham, Lake Jackson, TX (US); John Newton, Lake Jackson, TX (US); Wanda J. Stringfield, Midland, MI (US); Alexander B. Morgan, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 134 days.

(21) Appl. No.: 10/440,714

(22) Filed: May 19, 2003

(65) Prior Publication Data

US 2004/0033392 A1 Feb. 19, 2004

Related U.S. Application Data

(60) Provisional application No. 60/387,362, filed on Jun. 10, 2002, and provisional application No. 60/383,281, filed on May 24, 2002.

(51) Int. Cl.$^7$ ................................................ B32B 5/16
(52) U.S. Cl. ........................ 428/323; 428/324; 428/402; 428/403
(58) Field of Search ................................. 428/323, 324, 428/402, 403; 977/DIG. 1

(56) References Cited

U.S. PATENT DOCUMENTS

| | | | | |
|---|---|---|---|---|
| 4,877,484 A | * | 10/1989 | Bohrn et al. ................. | 162/103 |
| 5,330,734 A | * | 7/1994 | Johnson et al. ........... | 423/328.3 |
| 5,340,657 A | * | 8/1994 | Kerby et al. ................. | 428/552 |
| 5,973,053 A | | 10/1999 | Usuki et al. ................. | 524/445 |
| 5,993,769 A | | 11/1999 | Pinnavaia et al. .......... | 423/331 |
| 6,414,069 B1 | * | 7/2002 | Pinnavaia et al. .......... | 524/445 |
| 6,586,500 B2 | * | 7/2003 | Bagrodia et al. ........... | 523/209 |
| 6,653,388 B1 | * | 11/2003 | Barbee et al. .............. | 524/445 |

OTHER PUBLICATIONS

U.S. Provisional application No. 60/383,281; Applicant: Finlayson, et al.

U.S. Provisional application No. 60/387,362; Applicant: Finlayson, et al.

* cited by examiner

*Primary Examiner*—H. Thi Le
(74) *Attorney, Agent, or Firm*—Susan Moeller Zerull

(57) ABSTRACT

A cation exchanging layered material having a cation exchange capacity satisfied by ion-exchangeable organic and inorganic cations, the ion-exchangeable organic cation content of the betastructured cation exchanging layered material being in the range of from ten to ninety-five percent of the cation exchange capacity of the cation exchanging layered material. The structure of the material is unique and is defined as a "betastructure". A nanocomposite polymer incorporating such a "betastructured" cation exchanging layered material with a polymer.

35 Claims, 3 Drawing Sheets

BETASTRUCTURED MIXED ORGANIC AND INORGANIC CATION EXCHANGED LAYERED MATERIALS AND NANOCOMPOSITES

This application claims the benefit of U.S. Provisional No. 60/383,281 filed May 24, 2002 and U.S. Provisional No. 60/387,362, filed Jun. 10, 2002.

BACKGROUND

Delaminated or exfoliated cation exchanging layered materials (such as delaminated 2:1 layered silicate clays) can be used as a reinforcing filler in a polymer system. Such polymer systems are known as "nanocomposites" when at least one dimension of the delaminated cation exchanging layered material is less than sixty nanometers. Nanocomposite polymers generally have enhanced mechanical property characteristics vs. conventionally filled polymers. For example, nanocomposite polymers can provide both increased modulus and increased impact toughness, a combination of mechanical properties that is not usually obtained using conventional fillers.

Ideally, the degree of delamination of the cation exchanging layered material in a nanocomposite is such that only single layer units of the cation exchanging layered material are present. However, a significant enhancement in the physical properties of a polymer are often observed when two, three, four and more than four layer units are observed in a nanocomposite. Typically, the thickness of a single layer of a delaminated cation exchanging layered material is in the range of one or two nanometers while the length and width of such layer can be in the range of, for example, one hundred to one thousand nanometers. If the cation exchanging layered material is not delaminated in the polymer, then the mechanical property improvement of the polymer composite will usually be no better than if a conventional micron sized filler is dispersed in the polymer.

Cation exchanging layered materials are often treated with an organic cation (usually an "onium") to facilitate delamination of the cation exchanging layered material when it is blended with a polymer (see, for example U.S. Pat. No. 5,973,053). Conventionally, the layered material is "fully exchanged" or "overexchanged", i.e., the exchangeable cations of the layered material are essentially fully replaced by onium ions or the exchangeable cations of the layered material are essentially fully replaced by onium ions and the material contains additional onium ions.

Recent developments have been made using less than fully exchanged cation exchanging layered material. Pinnavaia et al. (U.S. Pat. No. 5,993,769) disclosed a 2:1 layered silicate clay composition wherein a portion of the cation exchange capacity of the clay was satisfied by an organic onium cation with the remainder of the cation exchange capacity of the clay being satisfied by an inorganic cation, the composition being "homostructured" and not randomly interstratified, regularly interstratified, phase segregated or entrapped. Pinnavaia et al. distinguished their homostructured composition from the randomly interstratified, regularly interstratified, phase segregated and entrapped compositions by the distinctive x-ray diffraction pattern of the homostructured composition, see FIGS. 1A to 1E and FIG. 2 of Pinnavaia et al.

Pinnavaia et al. asserted that their homostructured compositions were superior to the prior art randomly interstratified, regularly interstratified, phase segregated and entrapped compositions.

SUMMARY OF THE INVENTION

The instant invention is a cation exchanging layered material composition wherein the cation exchange sites of a cation exchanging layered material are occupied by organic and inorganic ions to form a heretofore unknown and undisclosed cation exchanging layered material structure herein defined as a "betastructure". The instant invention is a composition of matter, comprising a betastructured cation exchanging layered material having a cation exchange capacity satisfied by ion-exchangeable organic and inorganic cations, the ion-exchangeable organic cation content of the cation exchanging layered material being in the range of from ten to ninety-five percent of the cation exchange capacity of the cation exchanging layered material.

In another embodiment, the instant invention is a nanocomposite material, comprising: (a) 99–50 percent by weight of a polymer; and (b) 1–35 percent of a betastructured cation exchanging layered material having a cation exchange capacity satisfied by ion-exchangeable organic and inorganic cations, the ion-exchangeable organic cation content of the cation exchanging layered material being in the range of from ten to ninety-five percent of the cation exchange capacity of the betastructured cation exchanging layered material.

The betastructured cation exchanging layered material is defined by its unique x-ray diffraction pattern or by its unique structure.

DETAILED DESCRIPTION OF THE INVENTION

Figure 1:
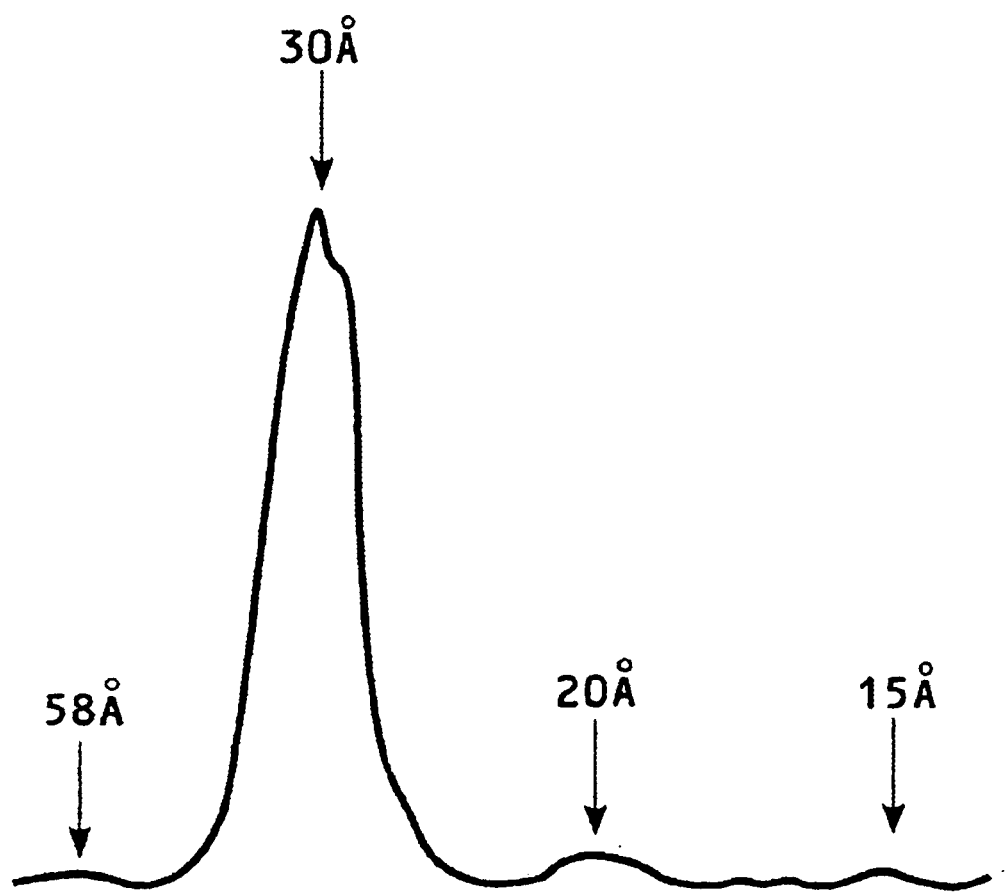
FIG. 1 is an x-ray diffraction pattern of a mixed organic and inorganic cation exchanging layered material of the instant invention.

Referring now to FIG. 1, therein is shown an x-ray diffraction pattern for fluoromica cation exchanging layered material wherein the ion-exchangable organic cation content is about 85 mole percent dimethyl, dihydrogenated tallow quaternary ammonium and wherein the ion-exchangable inorganic cation content is about 15 mole percent sodium. The pattern shown in FIG. 1 (a weaker peak at about 60 Angstroms, a stronger peak at about 30 Angstroms, a weaker peak at about 20 Angstroms and a weaker peak at about 15 Angstroms) is unique for cation exchanging layered material, the exchangeable cations of which are a mixture of organic cations and inorganic cations. The x-ray diffraction pattern shown in FIG. 1 is believed to be indicative of a novel "betastructured" cation exchanging layered material having its cation exchange capacity satisfied by ion-exchangeable organic and inorganic cations, the ion-exchangeable organic cation content of the cation exchanging layered material being in the range of from ten to ninety-five percent of the cation exchange capacity of the cation exchanging layered material.

Figure 2:
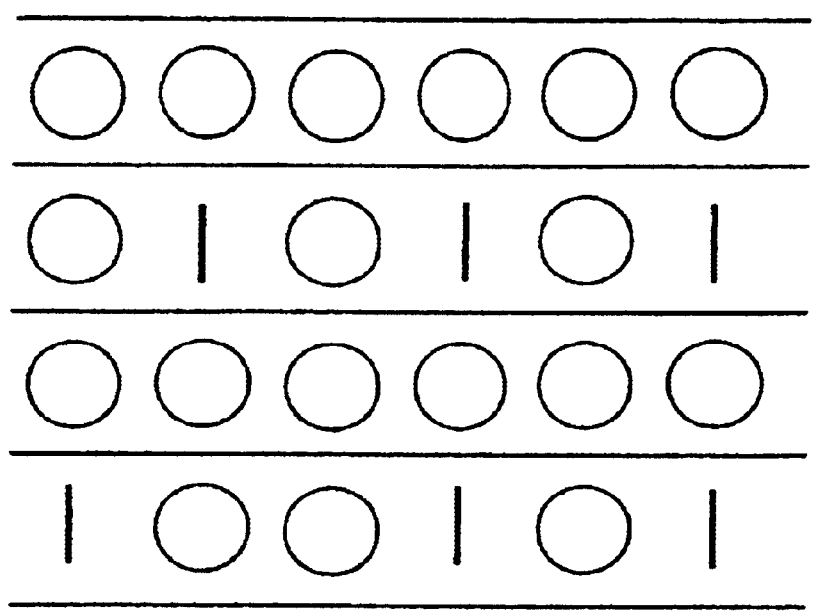
FIG. 2 is a schematic representation of a possible structure for the mixed organic and inorganic cation exchanging layered materials of the instant invention.
Figure 3:
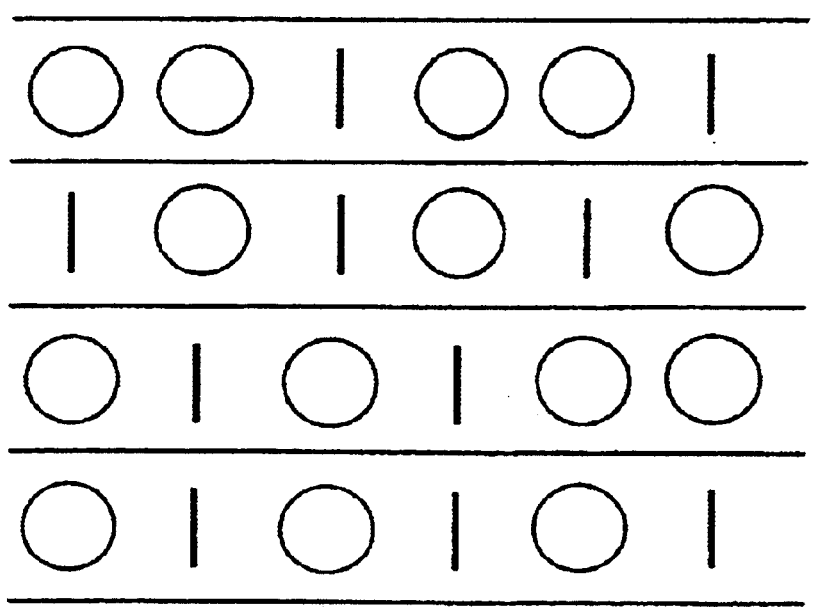
FIG. 3 is a schematic representation of another possible structure for the mixed organic and inorganic cation exchanging layered materials of the instant invention.

Referring now to FIGS. 2 and 3, therein is shown a schematic representation of two possible structures for the mixed organic and inorganic cation exchanging layered materials of the instant invention. At first glance, the schematic representation shown in FIGS. 2 and 3 appears to be the same as the schematic representation of a "homostructured" cation exchanging 2:1 layered silicate material having its cation exchange capacity satisfied by ion-exchangeable organic and inorganic cations as shown in FIG. 1D of U.S. Pat. No. 5,993,769. However, referring again to FIGS. 2 and 3, two distinctive features will be noted. First, alternating galleries have similar mole ratios of organic to inorganic ions. Second, neighboring galleries have different mole ratios of organic to inorganic ions. Both of the structures shown in FIGS. 2 and 3 are consistent with the x-ray diffraction pattern shown in FIG. 1. The term "betastructure" herein, is defined by any one of: (a) a cation exchanging layered material having its cation exchange capacity satisfied by ion-exchangeable organic and inorganic cations having an x-ray diffraction pattern as shown in FIG. 1 (a weaker peak at about 60 Angstroms, a stronger peak at about 30 Angstroms, a weaker peak at about 20 Angstroms and a weaker peak at about 15 Angstroms); (b) the structure shown in FIG. 2; or (c) the structure shown in FIG. 3. However, it should be understood that the numerical values in FIG. 1 and the relative intensities of the pattern may be different for different cation exchanging layered materials and different organic cations and even, perhaps to a lesser degree, for different organic to inorganic cation ratios and still be a "beta structure" as defined herein.

The term "cation exchanging layered material" means layered oxides, sulfides and oxyhalides, layered silicates (such as Magadiite and kenyaite) layered 2:1 silicates (such as natural and synthetic smectites, hormites, vermiculites, illites, micas, hormites, and chlorites).

Fluoromica (sometimes called fluormica) is an example of a synthetic 2:1 layered silicates where the formula is based on 4 silicon atoms per unit cell and the octahedral layer contains principally magnesium. Fluoromica is similar in formula to natural stevensites (where charge comes from magnesium vacancies in the octahedral layer) or hectorites (where magnesium and lithium are both present in the octahedral layer). The presence of up to two fluorine atoms per unit cell is required. The exchangeable gallery cations can include sodium, lithium, hydrogen, potassium, ammonium, calcium and or small organic ions. The sodium, lithium and hydrogen ions exchange rapidly. The sodium, lithium and hydrogen ion form of Fluoromica swell and disperse in water forming colloidal suspensions.

A typical unit cell formula for fluoromica (sometimes written as a doubled version) is: $Na_{2x}Mg_{3-x}Si_4O_{10}F_2$. If lithium is present, the formula is: $(Na+Li)2_xMg_{3-x}Si_4O_{10}F_2$. X can range from about 0 to about 1 and the sodium to lithium ratio can vary from 100:0 to 0:100. The fluoride stoichiometry is approximately 2. The formula for SOMASIF ME-100 commercial fluoromica can be written as $Na_{0.6}Mg_{2.7}Si_4O_{10}F_2$. Fluoromica from Topy Industries is similar but containing less magnesium and more sodium and or lithium. It should be understood that other metals may be present in small amounts in the above formulas. For example, the Topy Company fluoromica contains a small amount of aluminum.

The cation exchange capacity of a cation exchanging layered material describes the ability to replace one set of cations (typically inorganic ions such as sodium, calcium or hydrogen) with another set of cations (either inorganic or organic). The cation exchange capacity can be measured by several methods, most of which perform an actual exchange reaction and analyzing the product for the presence of each of the exchanging ions. Thus, the stoichiometry of exchange can be determined. It is observed that the various cation exchanging layered materials have different cation exchange capacities which are attributed to their individual structures and unit cell compositions. It is also observed for some cation exchanging layered materials that not all ions of the exchanging type are replaced with the alternate ions during the exchange procedure.

The composition of the instant invention can be made by stirring a cation exchanging layered material in water (typically 5–10 weight percent), with heating (typically to eighty degrees Celsius), adding a predetermined, sub-stoichiometric amount of the organic cation, stirring overnight, filtering off the supernatant, washing with water, drying (typically at eighty degrees Celsius in air), ball milled and sieved to produce a produce finer than 120 mesh. If acid is added with the organic cation, then the inorganic cation of the cation exchanging layered material will comprise hydrogen ion.

Alternatively, the composition of the instant invention can be made by mixing a cation exchanging layered material, the cation exchange capacity of which is essentially 100 percent satisfied by an organic cation, with five times its weight of ethanol for thirty minutes, filtering off the supernatant, washing with ethanol, drying (typically at eighty degrees Celsius in air), ball milled and sieved to produce a produce finer than 120 mesh. The product will probably contain less organic cation if a Soxhlet extraction with ethanol is used.

Alternatively, the composition of the instant invention can be made by mixing a cation exchanging layered material, the cation exchange capacity of which is essentially 100 percent satisfied by an organic cation, with five times its weight of ethanol/water and an acid (such as hydrochloric acid or sulfuric acid), filtering off the supernatant, washing with ethanol/water, drying (typically at eighty degrees Celsius in air), ball milled and sieved to produce a produce finer than 120 mesh. The ratio of organic to hydrogen ion (and orther residual inorganic ions) in the product is, of course, determined by the amount of acid used.

In another alternative process, the composition of the instant invention can be made by mixing a cation exchanging layered material, the cation exchange capacity of which is essentially 100 percent satisfied by hydrogen and other inorganic ions (usually by pre-treatment with an acid such as hydrochloric or sulfuric acid), with five times its weight of water and a sub-stoichiometric amount of an organic cation at elevated temperature (e.g., 80 degrees Celsius) for a sufficient time (e.g., overnight), filtering off the supernatant, washing with water, drying (typically at eighty degrees Celsius in air), ball milled and sieved to produce a produce finer than 120 mesh. The ratio of organic to hydrogen and other inorganic ions in the product is, of course, determined by the amount of organic cation used.

The term "organic cation" means a cation that contains at least one hydrocarbon radical. Examples of organic cations include, without limitation thereto, phosphonium, arsonium, sulfonium, oxonium, imidazolium, benzimidazolium, imidazolinium, protonated amines, protonated amine oxides, protonated betaines, ammoniums, pyridines, anilines, pyrroles, piperdines, pyrazoles, quinolines, isoqunolines, indoles, oxazoles, benzoxazoles, and quinuclidines. A preferred organic cation is a quaternary ammonium compound of formula $R_1R_2R_3R_4N^+$, wherein at least one of $R_1$, $R_2$, $R_3$ or $R_4$ contains ten or more carbon atoms. The term "organic cation" also includes treatment of the cation exchanging layered material with an acid followed by treatment with an organic amine to protonate the amine.

Blending the composition of the instant invention with molten polymer is a convenient process that can be used to make the nanocomposite of the instant invention. It should be understood that with regard to making a nanocomposite polymer the prior art points to many techniques that are also applicable with the composition of the instant invention. For example, when the polymer is a non-polar polymer (such as polyethylene and polypropylene) then a "compatabilizer" (such as a polar functionalized polymer, e.g., maleated polypropylene when the bulk polymer is polypropylene) can be used with the composition of the instant invention in the same way that a compatabilizer is used with prior art compositions (see, for example, COMPARATIVE EXAMPLE 1, below). Alternatively, a monomer(s) can be in-situ polymerized with the composition of the instant invention to make a nanocomposite polymer of the instant invention. Here again, the techniques used in prior art in-situ polymerizations of prior art compositions with a monomer(s) to make a nanocomposite can also be used with the composition of the instant invention.

COMPARATIVE EXAMPLE 1

A polypropylene nanocomposite is prepared by blending 80 parts of polypropylene with 10 parts of maleated polypropylene, and 10 parts of Fluoromica whose ion-exchange capacity is essentially 100 percent satisfied with dimethyl dihydrogenated tallow quaternary ammonium. The resulting nanocomposite has a flex modulus of 280,000 psi, a notched Izod impact strength of 4.5 foot pounds at room temperature and a notched Izod impact strength of 1.3 foot pounds at zero degrees Celsius.

EXAMPLE 1

The procedure of COMPARATIVE EXAMPLE 1 is repeated except that the Fluoromica's ion-exchange capacity is about 85 mole percent satisfied with dimethyl dehydrogenated tallow quaternary ammonium and about 15 mole percent with hydrogen and other inorganic ions. The resulting nanocomposite has a flex modulus of 250,000 psi, a notched Izod impact strength of 8.3 foot pounds at room temperature and a notched Izod impact strength of 1.7 foot pounds at zero degrees Celsius.

Figure 4:
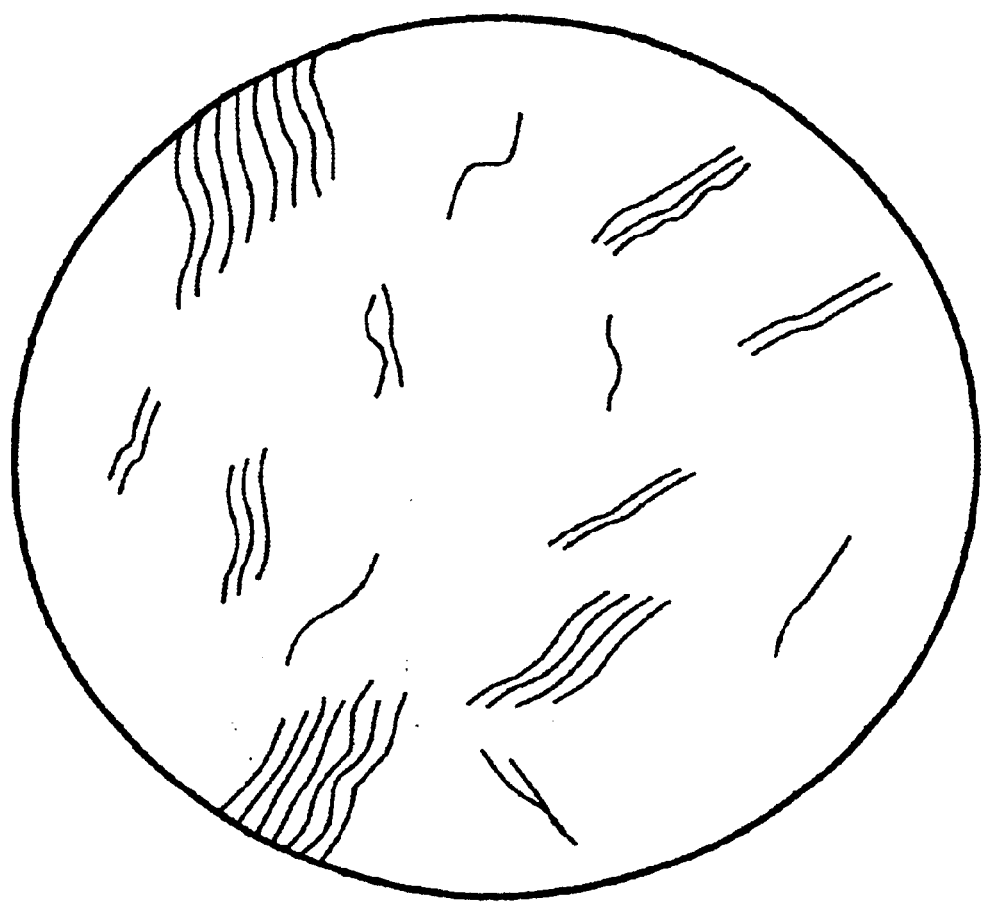
FIG. 4 is a schematic representation of a photomicrograph of a nanocomposite polymer of the instant invention.

FIG. 4 is a schematic representation of a representative photomicrograph of the nanocomposite polymer of this example. FIG. 4 shows the layered material being exfoliated to one, two, three, four and more than four layer units. More specifically, FIG. 4 shows 4 one layer units, 5 two layer units, 3 three layer units, 2 four layer units and two units that comprise more than four layers. Thus, the number percent of one, two, three and four layer units is $^{14}/_{16}$ or 87.5 percent. Preferably, the number percent of less than 20 layer units is greater than the number percent of more than 20 layer units. More preferably, the number percent of the one, two, three and four layer units is greater than the number percent of the more than four layer units.

EXAMPLE 2

The procedure of EXAMPLE 1 is repeated except that 70 parts of polypropylene and 20 parts of the treated floromica are used. The resulting nanocomposite has a flex modulus of 320,000 psi, a notched Izod impact strength of 1.5 foot pounds at room temperature and a notched Izod impact strength of 0.9 foot pounds at zero degrees Celsius.

COMPARATIVE EXAMPLE 2

A polypropylene nanocomposite is prepared by blending 60 parts of polypropylene with 20 parts of maleated polypropylene, and 20 parts of Fluoromica whose ion-exchange capacity is essentially 100 percent satisfied with dimethyl dihydrogenated tallow quaternary ammonium. The resulting nanocomposite has a flex modulus of 368,000 psi, a tensile modulus of 256,000 psi, a notched Izod impact strength of 0.5 foot pounds at room temperature.

EXAMPLE 3

The procedure of COMPARATIVE EXAMPLE 2 is repeated except that the Fluoromica's ion-exchange capacity is about 85 mole percent satisfied with dimethyl dehydrogenated tallow quaternary ammonium and about 15 mole percent with sodium ion. The resulting nanocomposite has a flex modulus of 423,000 psi, a tensile modulus of 398,000 psi and a notched Izod impact strength of 0.5 foot pounds at room temperature.

EXAMPLE 4

The procedure of Example 3 is repeated except that 10 parts of filler and 70 parts of polypropylene are used. The resulting nanocomposite has a flex modulus of 340,000 psi, a tensile modulus of 253,000 psi and a notched Izod impact strength of 0.3 foot pounds at room temperature.

EXAMPLE 5

The procedure of Example 3 is repeated except that 5 parts of filler and 75 parts of polypropylene are used. The resulting nanocomposite has a flex modulus of 261,000 psi, a tensile modulus of 223,000 psi and a notched Izod impact strength of 1.5 foot pounds at room temperature.

COMPARATIVE EXAMPLE 3

A polypropylene/thermoplastic elastomer "thermoplastic olefin" (TPO) nanocomposite is prepared by blending 25 parts of polypropylene with 40 parts of maleated polypropylene, and 10 parts of Fluoromica whose ion-exchange capacity is essentially 100 percent satisfied with dimethyl dihydrogenated tallow quaternary ammonium. The resulting nanocomposite is then blended with 25 parts of thermoplastic elastomer to form a TPO nanocomposite. The TPO nanocomposite has a flex modulus of 168,000 psi, a notched Izod impact strength of 13 foot pounds at room temperature, a notched Izod impact strength of 5.1 foot pounds at zero degrees Celsius, a notched Izod impact strength of 2.8 foot pounds at minus ten degrees Celsius and a notched Izod impact strength of 0.8 foot pounds at minus twenty degrees Celsius.

EXAMPLE 6

The procedure of COMPARATIVE EXAMPLE 3 is repeated except that the Fluoromica filler's ion-exchange capacity is about 78 mole percent satisfied with dimethyl dehydrogenated tallow quaternary ammonium and about 22 mole percent with sodium ion. The TPO nanocomposite has a flex modulus of 191,000 psi, a notched Izod impact strength of 15.3 foot pounds at room temperature, a notched Izod impact strength of 8.3 foot pounds at zero degrees Celsius, a notched Izod impact strength of 6 foot pounds at minus ten degrees Celsius and a notched Izod impact strength of 3.4 foot pounds at minus twenty degrees Celsius.

COMPARATIVE EXAMPLE 4

A polypropylene nanocomposite is prepared by blending 66 parts of polypropylene with 26 parts of maleated polypropylene, and 8 parts of Fluoromica whose ion-exchange capacity is essentially 100 percent satisfied with dimethyl dihydrogenated tallow quaternary ammonium. The resulting nanocomposite is tested for flammability using test method ASTM E-1354-92 and showed a time to ignition of 59 seconds.

EXAMPLE 7

The procedure of COMPARATIVE EXAMPLE 4 is repeated except that the Fluoromica whose ion-exchange capacity is essentially 100 percent satisfied with dimethyl dihydrogenated tallow quaternary ammonium was soxhlet extracted with ethanol for one day. The resulting nanocomposite is tested for flammability using test method ASTM E-1354-92 and showed a time to ignition of 65 seconds.

EXAMPLE 8

The procedure of COMPARATIVE EXAMPLE 4 is repeated except that the Fluoromica whose ion-exchange capacity is essentially 100 percent satisfied with dimethyl dihydrogenated tallow quaternary ammonium was soxhlet extracted with ethanol for two days. The resulting nanocomposite is tested for flammability using test method ASTM E-1354-92 and showed a time to ignition of 66 seconds.

EXAMPLE 9

The procedure of COMPARATIVE EXAMPLE 4 is repeated except that the Fluoromica whose ion-exchange capacity is essentially 100 percent satisfied with dimethyl dihydrogenated tallow quaternary ammonium was soxhlet extracted with ethanol for three days. The resulting nanocomposite is tested for flammability using test method ASTM E-1354-92 and showed a time to ignition of 68 seconds.

EXAMPLE 10

The procedure of COMPARATIVE EXAMPLE 4 is repeated except that the Fluoromica whose ion-exchange capacity is essentially 100 percent satisfied with dimethyl dihydrogenated tallow quaternary ammonium was soxhlet extracted with ethanol for four days. The resulting nanocomposite is tested for flammability using test method ASTM E-1354-92 and showed a time to ignition of 70 seconds.

What is claimed is:

1. A composition of matter, comprising: a betastructured cation exchanging layered material having a cation exchange capacity satisfied by ion-exchangeable organic and inorganic cations, the ion-exchangeable organic cation content of the cation exchanging layered material being in the range of from ten to ninety-five percent of the cation exchange capacity of the cation exchanging layered material.

2. The composition of claim 1, wherein the organic cation comprises a quaternary ammonium compound of formula $R_1R_2R_3R_4N^+$, wherein at least one of $R_1$, $R_2$, $R_3$ or $R_4$ contains ten or more carbon atoms.

3. The composition if claim 2, wherein the cation exchanging layered material comprises fluoromica.

4. The composition of claim 2, wherein the quaternary ammonium compound consists essentially of dimethyl, dihydrogenated tallow quaternary ammonium.

5. The composition of claim 1, wherein the organic cation is selected from the group consisting of phosphonium, arsonium, sulfonium, oxonium, imidazolium, benzimidazolium, imidazolinium, protonated amines, amine oxides, betaines, pyridines, anilines, pyrroles, piperidines, pyrazoles, quinolines, isoquinolines, indoles, oxazoles, benzoxazoles, and quinuclidines.

6. The composition if claim 5, wherein the cation exchanging layered material comprises fluoromica.

7. The composition of claim 1, wherein the ion-exchangeable inorganic cation of the cation exchanging layered material comprises hydrogen ion.

8. The composition if claim 7, wherein the cation exchanging layered material comprises fluoromica.

9. The composition of claim 7, wherein the organic cation comprises dimethyl, di-hydrogenatedtallow quaternary ammonium.

10. The composition of claim 1, wherein the organic cation content of the cation exchanging layered material consists of more than fifty percent of the cation exchange capacity of the cation exchanging layered material.

11. The composition if claim 10, wherein the cation exchanging layered material comprises fluoromica.

12. The composition of claim 1, wherein the organic cation content of the cation exchanging layered material consists of more than seventy five percent of the cation exchange capacity of the cation exchanging layered material.

13. The composition of claim 12, wherein the cation exchanging layered material comprises fluoromica.

14. The composition of claim 13, wherein the organic cation consists essentially of dimethyl, di-hydrogenatedtallow quaternary ammonium.

15. The composition if claim 1, wherein the cation exchanging layered material comprises fluoromica.

16. The composition of claim 1, wherein the organic cation comprises dimethyl, di-hydrogenated tallow quaternary ammonium.

17. A nanocomposite material, comprising: (a) 99–50 percent by weight of a polymer; and (b) 1–35 percent of a betastructured cation exchanging layered material having a cation exchange capacity satisfied by ion-exchangeable organic and inorganic cations, the ion-exchangeable organic cation content of the cation exchanging layered material being in the range of from ten to ninety-five percent of the cation exchange capacity of the cation exchanging layered material.

18. The nanocomposite material of claim 17, wherein the organic cation comprises a quaternary ammonium compound of formula $R_1R_2R_3R_4N^+$, wherein at least one of $R_1$, $R_2$, $R_3$ or $R_4$ contains ten or more carbon atoms.

19. The nanocomposite material of claim 18, wherein the cation exchanging layered material comprises fluoromica.

20. The nanocomposite material of claim 18, wherein the quaternary ammonium compound consists essentially of dimethyl, di-hydrogenatedtallow quaternary ammonium.

21. The nanocomposite material of claim 17, wherein the organic cation is selected from the group consisting of phosphonium, arsonium, sulfonium, oxonium, imidazolium, benzimidazolium, imidazolinium, protonated amines, amine oxides, betaines, pyridines, anilines, pyrroles, piperidines, pyrazoles, quinolines, isoquinolines, indoles, oxazoles, benzoxazoles, and quinuclidines.

22. The nanocomposite material of claim 21, wherein the cation exchanging layered material comprises fluoromica.

23. The nanocomposite material of claim 17, wherein the ion-exchangable inorganic cation of the cation exchanging layered material comprises hydrogen ion.

24. The nanocomposite material of claim 23, wherein the cation exchanging layered material comprises fluoromica.

25. The nanocomposite material of claim 23, wherein the organic cation comprises dimethyl, di-hydrogenatedtallow quaternary ammonium.

26. The nanocomposite material of claim 17, wherein the organic cation content of the cation exchanging layered material consists of more than fifty percent of the cation exchange capacity of the cation exchanging layered material.

27. The nanocomposite material of claim 27, wherein the cation exchanging layered material comprises fluoromica.

28. The nanocomposite material of claim 17, wherein the organic cation content of the cation exchanging layered material consists of more than seventy five percent of the cation exchange capacity of the cation exchanging layered material.

29. The nanocomposite material of claim 28, wherein the cation exchanging layered material comprises fluoromica.

30. The nanocomposite material of claim 29, wherein the organic cation consists essentially of dimethyl, dehydrogenated tallow quaternary ammonium.

31. The nanocomposite material of claim 17, wherein the cation exchanging layered material comprises fluoromica.

32. The nanocomposite material of claim 17, wherein the organic cation comprises dimethyl, di-hydrogenatedtallow quaternary ammonium.

33. The nanocomposite material of claim 17, further comprising a thermoplastic elastomer phase interdispersed with the polymer.

34. The nanocomposite material of claim 33, wherein the polymer comprises more than fifty weight percent polypropylene.

35. The nanocomposite material of claim 17, wherein the flammability of the nanocomposite material is less than the flammability of a nanocomposite material comprised of the same weight percent of the same polymer and the same weight percent of the same cation exchanging layered material, wherein the ion-exchangeable organic cation content of the cation exchanging layered material is more than ninety-five percent of the cation exchange capacity of the cation exchanging layered material.

* * * * *